United States Patent [19]

Austermann et al.

[11] Patent Number: 5,350,990
[45] Date of Patent: Sep. 27, 1994

[54] CIRCUIT ARRANGEMENT FOR COMMUTATING A RELUCTANCE MOTOR

[75] Inventors: Ralf Austermann, Rietberg; Heinz van der Broeck, Zülpich, both of Fed. Rep. of Germany

[73] Assignee: U.S. Philips Corporation, New York, N.Y.

[21] Appl. No.: 758,939

[22] Filed: Sep. 11, 1991

[30] Foreign Application Priority Data

Sep. 15, 1990 [DE] Fed. Rep. of Germany ....... 4029335

[51] Int. Cl.$^5$ ............................................. H02P 7/63
[52] U.S. Cl. .................................. 318/701; 318/254; 318/810
[58] Field of Search ............... 318/701, 439, 254, 696, 318/138, 822, 821, 823, 810; 250/363.02, 369; 335/125, 219, 220

[56] References Cited

U.S. PATENT DOCUMENTS

| | | | |
|---|---|---|---|
| 3,704,462 | 11/1972 | Pihl | 335/125 |
| 3,891,905 | 6/1975 | Müller | 318/138 |
| 4,065,704 | 12/1977 | Bailey | 318/822 |
| 4,169,990 | 10/1979 | Lerdman | 318/138 |
| 4,186,307 | 1/1980 | Tanaka et al. | 250/363.02 |
| 4,253,053 | 2/1981 | Ray et al. | 318/701 |
| 4,376,261 | 3/1983 | von der Heide et al. | 318/254 |
| 4,479,078 | 10/1984 | Kidd et al. | 318/254 |
| 4,739,240 | 4/1988 | MacMinn et al. | 318/696 |
| 4,933,620 | 6/1990 | MacMinn et al. | 318/701 |

FOREIGN PATENT DOCUMENTS 3819097 12/1989 Fed. Rep. of Germany .
1572586 7/1980 United Kingdom .

OTHER PUBLICATIONS

T. J. E. Miller, "Brushless Permanent-Magnet and Reluctance Motor Drives", Claredon Press, Oxford 1989, pp. 171-180.

Primary Examiner—William M. Shoop, Jr.
Assistant Examiner—John W. Cabeca
Attorney, Agent, or Firm—Laurie E. Gathman; Edward Blocker

[57] ABSTRACT

A circuit arrangement for commutating a reluctance motor including a current generator which produces first and second cyclic sequences of current pulses. In response to the first cyclic sequence applied to the stator windings of the motor, a rotor travels a predetermined distance along a motion coordinate path. Application of the second sequence to the stator windings results in the rotor traveling at least twice the predetermined distance along the motion coordinate path. The second sequence, which is applied when rotor speed exceeds a predetermined level, is formed by omitting predetermined current pulses from the first cyclic sequence.

16 Claims, 4 Drawing Sheets

CIRCUIT ARRANGEMENT FOR COMMUTATING A RELUCTANCE MOTOR

BACKGROUND OF THE INVENTION

The invention relates to a circuit arrangement for commutating a reluctance motor having a rotor rotatable relative to a stator. The stator has a number of windings to which current pulses of predeterminable length and phase relative to the motion coordinate of the rotor are fed based on the position and speed of the rotor.

U.S. Pat. No. 4,739,240 discloses a conventional circuit arrangement for commutating a reluctance motion. The commutator for a microcomputer based switched reluctance drive includes a memory, for example, a ROM, for storing stator phase firing patterns. This commutator enables selective adjustment of the turn-on angle and pulse length of phase switching current pulses. Firing patterns differing only in pulse length of their respective pulses can be stored in the memory. The adjustment of pulse phase and pulse duration allows torque control of the motor over a wide range.

A conventional converter circuit is also disclosed in a book entitled "Brushless Permanent-Magnet and Reluctance Motor Drives" by T. J. E. Miller, Clarendon Press, Oxford, 1989, pp. 177 to 180. More specifically, FIG. 7.16(b) with attendant description on page 178. last paragraph, page 179 as well as page 180, first paragraph, a converter circuit for an n-phase motor in which only n+1 transistors are necessary. For controlling the current amplitude, high-frequency "current chopping" is performed in one "top" transistor of that common circuit to all phases, i.e. windings of the motor. The "bottom" transistors commutate the chopped voltage or chopped current in a precisely predetermined order to the phases of the motor, controlled by a sensing means for determining the position of the motor shaft and by a gate logic. As will be explained hereinafter, this simplified switching circuit will practically not lose on "functionality" compared with a "complete" switching circuit comprising two transistors per phase. However, it should be observed that at high speeds the phases cannot be turned off sufficiently fast by the simplified commutator so that a braking torque occurs as a result of which the difference between driving torque and braking torque—referenced nett torque—diminishes very fast with higher speeds and the motor losses are augmented.

Furthermore, it has appeared that also the measures described in U.S. Pat. No. 4,739,240 are not suitable for remedying the abovedescribed disadvantages at higher speeds of the reluctance motor.

It is an object of the invention to provide a simple circuit arrangement for commutating a reluctance motor, which arrangement ensures even with very high speeds a perfect commutation and thus a high torque and low losses.

This object is achieved by means of a circuit arrangement in which after each supplied current pulse at least the next current pulse in the cyclic train, predetermined for low speeds, is omitted. The next current pulse is omitted when speeds exceed a predeterminable value.

The circuit arrangement according to the invention can be used for operating both rotary and linear motor configurations. With the conventional rotary motor in which the stator and rotor are arranged in a rotationally symmetrical manner, the windings on the stator have been provided in a specific angle division and order along the circumference and thus the motion coordinates of the rotor have specific, preferably uniform angular spacings. The order of the windings along the motion coordinates represents a first cyclic arrangement in which a cycle is formed by an angle of 360°, i.e. one rotation of the rotor. The first cyclic arrangement of the windings is passed after each complete rotation of the rotor.

However, a cycle for a linear motor can also be determined such that it comprises the path or section respectively, of the stator on which the described windings are arranged in a predetermined order. A longer stator would then accordingly be formed by linking a plurality of such cycles.

When the rotor moves relative to the stator along the motion coordinate, the spatial distances covered by the rotor from the beginning of a current pulse to the next current pulse remain constant according to the state of the art. The associated time intervals, however, are shortened when higher speeds are desired. Because the switch-on and off operations of the current pulses in the windings depend on the inductance of the windings and on the available voltages, the time intervals necessary for this switching will essentially remain unchanged even with higher speeds, whereas the time distances between the beginnings of two current pulses become ever shorter with increasing speeds. When a specific speed determined by the structure of the reluctance motor concerned is exceeded, the time-distance between two successive current pulses will fall short of a value below which it is no longer possible to provide current pulses having switch-on and off operations in the required form. In particular successive current pulses start to overlap so that the aforementioned braking torques and stator losses occur.

The invention now eliminates this detrimental effect in a simple manner in that specific sequential current pulses are omitted which are otherwise present in the sequence of current for individual windings provided for at low speeds, i.e. in the cyclic sequence of the windings, that is to say, the windings concerned at this point of the motion coordinates of the rotor are not supplied with current when speeds exceed a predeterminable value that can be determined based on the motor configuration for each case. For example, every second current pulse may be omitted. It is also possible to form only every third current pulse and omit two current pulses between each pair of current pulses formed, etc. In this manner each single current pulse has the disposal of a larger section of the motion coordinate when the time duration is unchanged, without the possibility of two successive current pulses overlapping. Thus it is possible to avoid the damaging braking torque and reach higher speeds with the rotor.

Preferably, the supplied current pulses in excess of the predeterminable speed are lengthened by a predeterminable value relative to the motion coordinate of the rotor such that their final positions remain unchanged relative to the motion coordinate. Consequently, larger time intervals are available for the supplied current. By maintaining the final positions of the current pulses while lengthening the current pulses damaging braking torque is avoided. The sufficient time duration of the current pulses then makes faultless speed and power controls of the reluctance motor possible even at high speeds.

A circuit arrangement according to the invention devised for feeding the reluctance motor from a dc voltage source advantageously comprises an asymmetrical H circuit for each winding of the reluctance motor with a first longitudinal branch, common to all the H circuits, and a second longitudinal branch arranged between terminals of the dc voltage source. Each of the second longitudinal branches include a switch element in series combination with a rectifier element. The rectifier element is reversely poled relative to the dc voltage source. In each H circuit the switch element of one longitudinal branch and the rectifier element of the other longitudinal branch are connected to the same terminal of the dc voltage source, and the associated winding in the transverse branch of the H circuit is arranged between the junctions of the switch element and rectifier element of each longitudinal branch.

The circuit arrangement in accordance with the invention is of simple construction and operation even at very high speeds.

Application of the above-described circuit arrangement for purposes of speed or power control, which includes a current control scheme, can be easily achieved by having associated switch elements of the second longitudinal branches coupled through a common measuring element to the dc voltage source terminal of the second longitudinal branches coupled through.

Further to the disclosure of the above-described embodiments of the circuit arrangement according to the invention, reference is expressly made to the contents of DE-OS 38 19 097.

In accordance with a feature of the invention, a position signal generator generates a position signal that represents the position of the rotor along the motion coordinate. The circuit arrangement can also include a speed signal representing the speed of the rotor which is derived from the time-dependent changes of the position signal. A separate sensor for sensing the speed of the rotor will then not be necessary.

The circuit arrangement in accordance with the invention involves relatively little circuitry little circuitry at low cost by requiring that the rotor be subdivided in to a second cyclic arrangement. The position signal generator preferably comprises a motion coordinate generator connected to the rotor, subdivided in accordance with the second cyclic arrangement having a number of sensing elements. The number of sensing elements corresponds to the second cyclic arrangement. The sensing elements are interspaced along the motion coordinate of the rotor by a unit of length that forms a part of a complete cycle of the stator arrangement determined by the least common multiple of the first and second cyclic arrangements. The motion coordinate generator has a cyclic arrangement such that the sensing elements produce a first signal value over a first section of two units of length and a second signal value over a contiguous second section of four units of length.

A conventional signal generator such as described in British Patent Specification 1 572 586 includes a disk drive system having a brushless dc motor. The motor has a floppy disk rotatable by a rotor. The disk has a circular array of transparent slots or apertures distributed around its periphery forming a tachometer track. This tachometer track is scanned with an optical sensing assembly which produces a train of timing signals when the floppy disk is rotating. These timing signals are processed as speed signals in a speed control network. The floppy disk also has a pair of diametrically opposite radial extensions or paddles which are opaque and occupy a 90° sector on the disk perimeter. Opposite these paddles are three optical sensing assemblies evenly distributed over a 60° sector of the disk interspaced by 30°. Each of these sensing assemblies produces an output signal only if neither paddle is positioned opposite that assembly. When the floppy disk rotates, three square-wave position signals are produced, with the pulses in the signals being displaced in phase by an angle of 30°.

In contrast thereto, the position signal generator in accordance with the invention is used for forming both the position signal and the speed signal which leads to aforementioned simplification in construction and operation of circuitry for commutating a reluctance motor.

A highly cost-effective and compact structure, adaptable to different commutating reluctance motor structures, the circuit arrangement according to the invention further includes a control array responsive to the position signal and speed signal, for switching the current pulses applied to the windings. The control array preferably comprises a memory arrangement for storing switch information signals corresponding to the various combinations of position and speed signals. The memory arrangement can include different types of ROM configurations.

Unlike the control system of the present invention, conventional control systems for a brushless dc motor such as described in U.S. Pat. No. 4,479, 078 include ROM configurations for controlling the corn mutated energy supplied to the windings arrangements. Also for the reluctance motor and the operational mode according to the present invention a simplification and price reduction are provided.

Further advantageous embodiments of the invention are claimed in the dependent claims.

BRIEF DESCRIPTION OF THE DRAWINGS

A preferred embodiment of the invention is exemplified in the accompanying drawing, in which.

DETAILED DESCRIPTION OF THE PREFERRED EMBODIMENT

Figure 1:
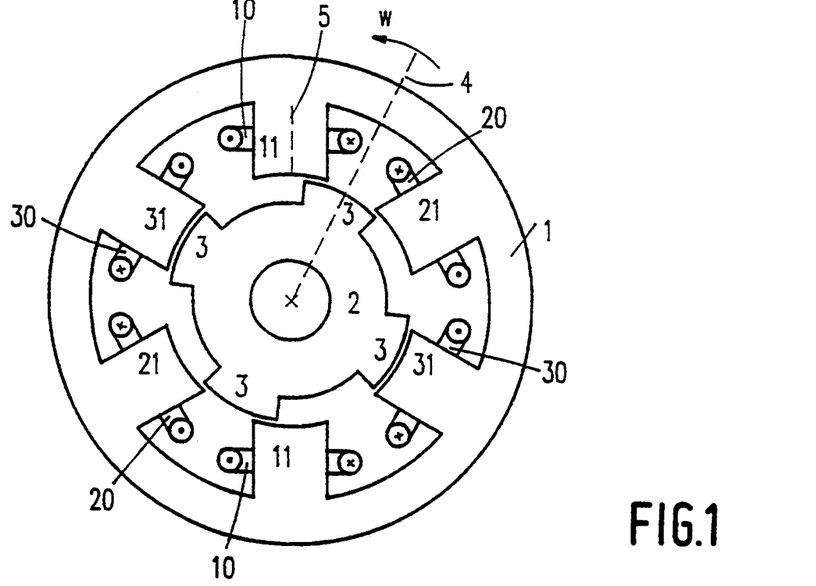
FIG. 1 is a cross-sectional view of a circuit arrangement for commutating a reluctance motor according to the invention.

The reluctance motor as shown in FIG. 1 comprises a stator 1 with a rotor 2 rotatable around its longitudinal axis along a motion coordinate W. The stator 1 has three windings 10, 20, 30 evenly distributed over the circumference of the stator 1 along the motion coordinate W. Each of the windings 10, 20, 30 is then divided into two parts, which are positioned on two diametrically opposite stator poles 11, 21 and 31 respectively. The windings 10, 20, 30 form a first cyclic arrangement along the motion coordinate W, while a complete cycle of the stator arrangement comprising stator 1 and windings 10, 20, 30 is equal to a complete rotation, i.e. an angle range of 360° along the motion coordinate W. In a second cyclic arrangement the rotor 2 comprises tour equidistant rotor poles 3 along the motion coordinate W. Also in this case a full cycle is formed by an angular range of 360° along the motion coordinate W.

For producing a movement of the rotor 2 along the motion coordinate W, current pulses are fed to the windings 10, 20, 30 in a cycle according to their arrangement in stator 1 and in dependence on the position and speed of the rotor 2. The length of these current pulses is measured in the direction of the motion coordinate W. In the example shown in FIG. 1 the first winding 10 is supplied with the train of current pulses I1 when the rotor 2 is positioned as illustrated. Rotor 2 moves along the motion coordinate W to a position in which the radial dashed line 4 running from the centre of the rotor 2 to the circumference is aligned to the dashed line 5 shown in the top stator pole 11. When this angle of rotation is attained, i.e. along the motion coordinate W, the train of current pulses I1 in the first winding 10 is terminated and, simultaneously, the train of current pulses is supplied to the second winding 20. Rotor 2 now moves 30° further in the direction of the motion coordinate W until the two rotor poles 3 are facing the stator poles 21. Application of the current pulses to the second winding 20 is terminated and a train of current pulses I3 is supplied to the third winding 30. Rotor 2 is moved by another 30° along the motion coordinate W. In this order the feeding of the current pulses to the windings 10, 20 and 30 is continued until the rotor 2 has performed a full rotation. The current pulses then occur in a cyclic train, while a complete cycle of the current pulses in the exemplary motor as shown in FIG. 1 corresponds to a full rotation of the rotor 2.

Figure 3:
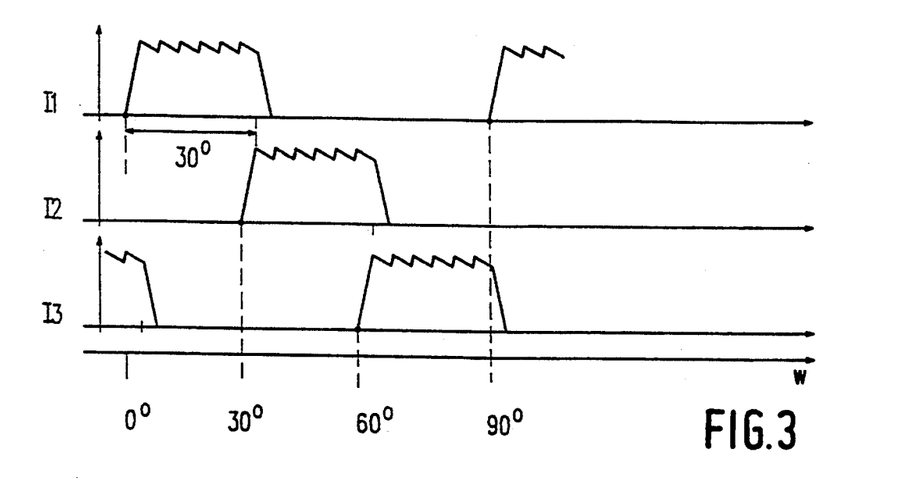
FIGS. 3 and 4 graphically show the reluctance motor winding currents for two different types of operation.

FIG. 3 shows in a simplified version, a sequence of current pulses through the windings 10, 20, 30. In this drawing, current pulses I1, I2 and I3 represent the currents flowing through the first, second and third windings 10, 20 and 30, respectively. In the range of the motion coordinate W from 0° to a 90° angle of rotation which corresponds to a quarter of a complete cycle, the trains of current pulses I1, I2 and I3 succeed one another with a length of 30° relative to the motion coordinate W. The end of the train of current pulses I3 in the third winding 30 is followed by the next train of current pulses I1 in the first winding 10, etc.

The cyclic train shown in FIG. 3 of the current pulses I1, I2, I3 in the windings 10, 20, 30 is used at low speeds and, in FIG. 3, is represented for such use. When the speed of the rotor 2 is increased, the length of each train of current pulses I1, I2, I3 along the motion coordinate W remains unchanged, but the duration of the individual current pulses within each train is reduced. The edges of the trains of current pulses I1, I2, I3 depend on the inductivities of the reluctance motor and thus have time constants which are substantially independent of the speed of the rotor 2. The edges therefore more significantly affect each train of current pulses as rotor speed increases. Consequently, the desired form of each train of current pulses I1, I2, I3 is inhibited and no longer possible beyond a speed value defined by the type of structure; at most each train of current pulses covers a larger distance along the motion coordinate W. In the predetermined cyclic train of current pulses I1, I2, I3 as shown in FIG. 3, beyond the aforesaid speed value this will lead to a reduced power and high current losses.

Figure 4:
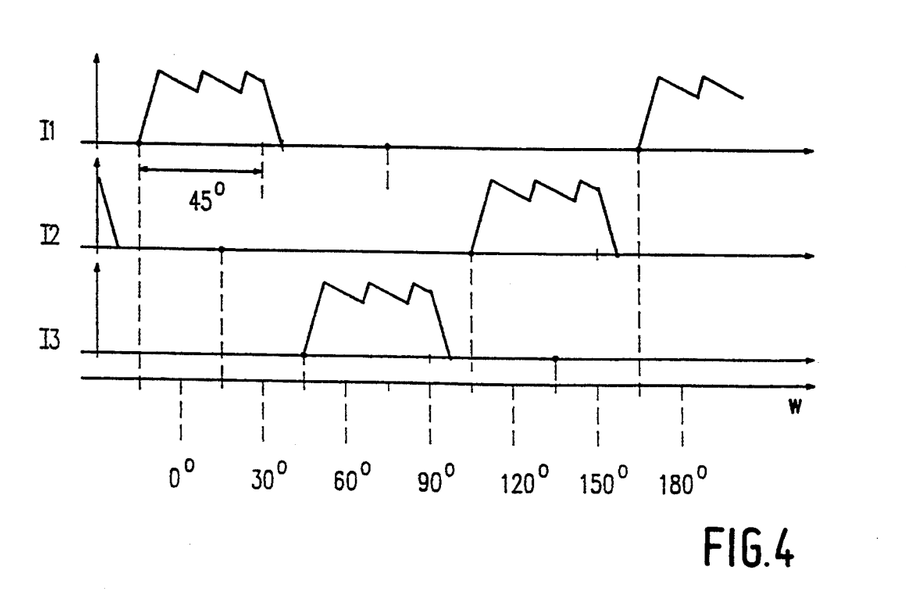

According to the invention, at least certain trains of current pulses in the cyclic train for low speeds are omitted so as to remedy the above-mentioned disadvantages at speeds beyond a predeterminable value which value can be selected on the basis of the structural data of the reluctance motor. Preferably, every other (i.e. second) pulse train is omitted from the cyclic train of current pulses to be fed at low speeds. This case is represented in FIG. 4. From then on every second pulse is omitted from the cyclic train of current pulses I1, I2, I3 shown in FIG. 3, so that a current pulse train in the third winding 30, i.e. pulse train I3 follows current pulse train I1 followed by current pulse train I2. More particularly, current pulse train I1, which immediately follows current pulse train I3, is omitted in accordance with the invention.

In addition, as shown in FIG. 4, each current pulse train is extended in time by a predeterminable amount relative to the motion coordinate W of the rotor 2, that is with unchanged end positions and leading edges which have been extended by 15°. Consequently, at high speeds a sufficiently long time interval is achieved permitting a complete rise in individual current pulses within trains I1, I2 and I3 (i.e. to the desired amplitude value), so that current and thus power control of the reluctance motor can be realised even at high speeds. Accordingly, in FIG. 4 the first current train I1 begins at −15° in lieu of 0°, the current train I3 fed next begins at 45° in lieu of 60° when the motor is operated in accordance with FIG. 3 (low speeds), etc.

Figure 2:
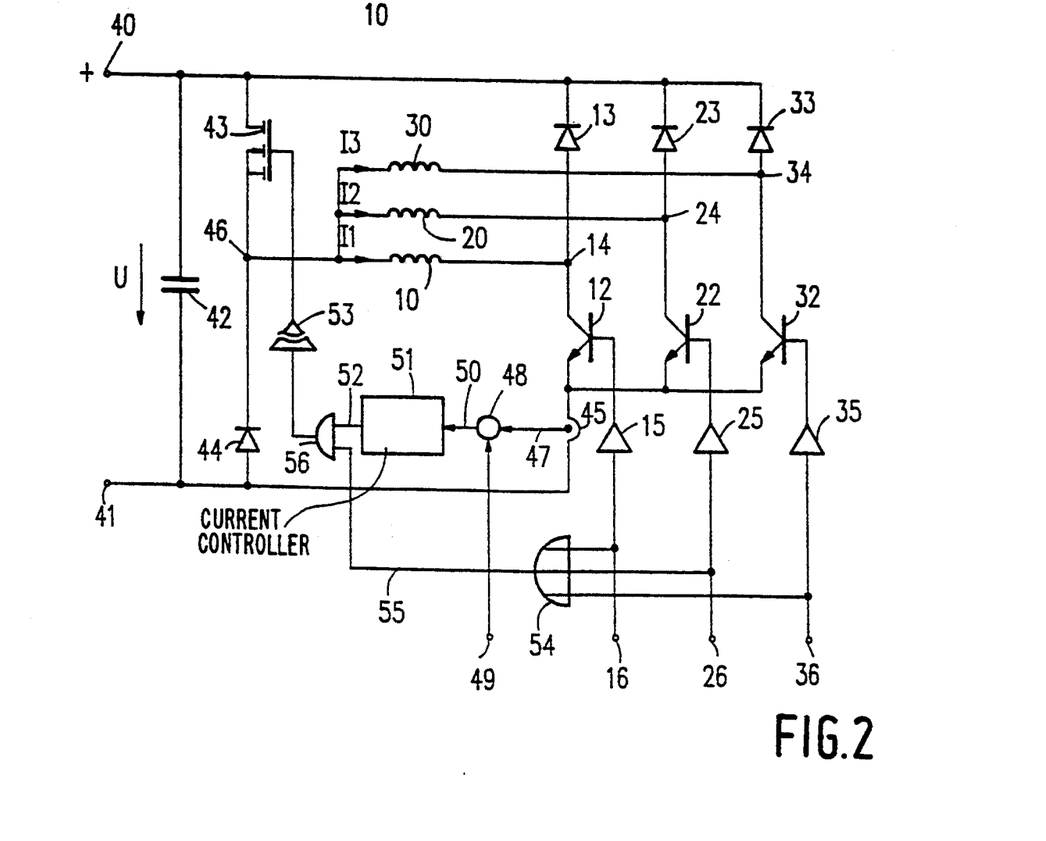
FIG. 2 is a simplified static converter circuit for feeding the reluctance motor of FIG. 1.

FIG. 2 shows a particularly simplified circuit arrangement for feeding the reluctance motor as shown in FIG. 1 from a dc voltage source which is connected to two supply voltage terminals 40, 41 of the circuit and produces a dc voltage U, which voltage is available at a smoothing capacitor 42 connected to the supply voltage terminals 40, 41. For each winding 10, 20, 30 of the reluctance motor there is an asymmetrical H circuit with a first longitudinal branch common to all the H circuits, which branch comprises a series combination of a current controlling transistor 43 and a kick-back diode 44 whose polarity is reversed relative to the dc voltage U. In addition to this common first longitudinal branch each asymmetrical H circuit comprises a second longitudinal branch which includes a selector transistor 12, 22, 32, a second kick-back diode 13, 23, 33 respectively, connected in series to the transistor and having a reversed polarity relative to the dc voltage U, and further in the embodiment shown in FIG. 2 a measuring element 45 common to all the second longitudinal branches. The current controlling transistor 43 as well as the selector transistors 12, 22 and 32 form the switch elements of the associated longitudinal branches. The kick-back diodes 44, 13, 23, 33 form the rectifier elements of the associated longitudinal branches. Furthermore, in each H circuit one side of a switch element 43 of one longitudinal branch 43, 44 and the rectifier elements 13, 23 and 33 respectively, of the other longitudinal branches 12, 13; 22, 23 and 32, 33 are connected to the same terminal of the feeding voltage 40, i.e. to the same terminal of the dc voltage source. The associated windings 10, 20 and 30 of the reluctance motor are arranged in the transverse branch of the H circuit between the junctions of the switch elements 43; 12, 22 and 32 and the rectifier elements 44; 13, 23 and 33 of each longitudinal branch. These junctions are labelled 46: 14, 24 and 34 respectively.

The common measuring element 45 through which the second longitudinal branches 12, 13; 22, 23 and 32, 33 are connected to the terminal 41 of the dc voltage source, is arranged as a current measuring element for measuring the amplitudes of the current pulses I1, I2 and I3 respectively. The measured current value is applied by the measuring element 45 over a measuring line 47 to a subtractor 48 and subtracted there from a nominal current value supplied through a nominal current value terminal 49. The difference formed thus reaches a current controller 51 through an input 50, which controller produces at its output 52 a switching signal for the current controlling transistor 43. This switching signal which may additionally be amplified as required in an amplifier stage 53, is used for turning the current controlling transistor 43 on and off in the high-frequency mode, the current controller 51 adjusting the duty cycle in accordance with the control deviation between the measured current value and the nominal current value.

The circuit as shown in FIG. 2 further includes for each of the selector transistors 12, 22 and 32 driving amplifiers 15, 25 and 35 connected to the respective bases, through which amplifiers switching signals from selector terminals 16, 26 and 36 are applied to the selector transistors 12, 22 and 32 respectively. In response to these switching signals, the winding 10, 20 or 30 is supplied with the appropriate current pulse train, that is, supplied with either current pulse train I1, I2 or I3 based on the position adopted by the rotor 2 along its motion coordinate W. Current pulse trains I1, I2 and I3 therefore are formed under the control of the current controlling transistor 43. Furthermore, an OR gate 54 forms a release signal on a line 55 on the basis of the three switching signals from the selector terminals 16, 26 and 36, which release signal, through an AND gate 56, permits passing the switching signal for the current controlling transistor 43 at the output 52 of the current controller 51 only in the time intervals in which at least one of the selector transistors 12, 22 and 32 is conductive and in which a current pulse I1, I2 and I3 flows.

Figure 5:
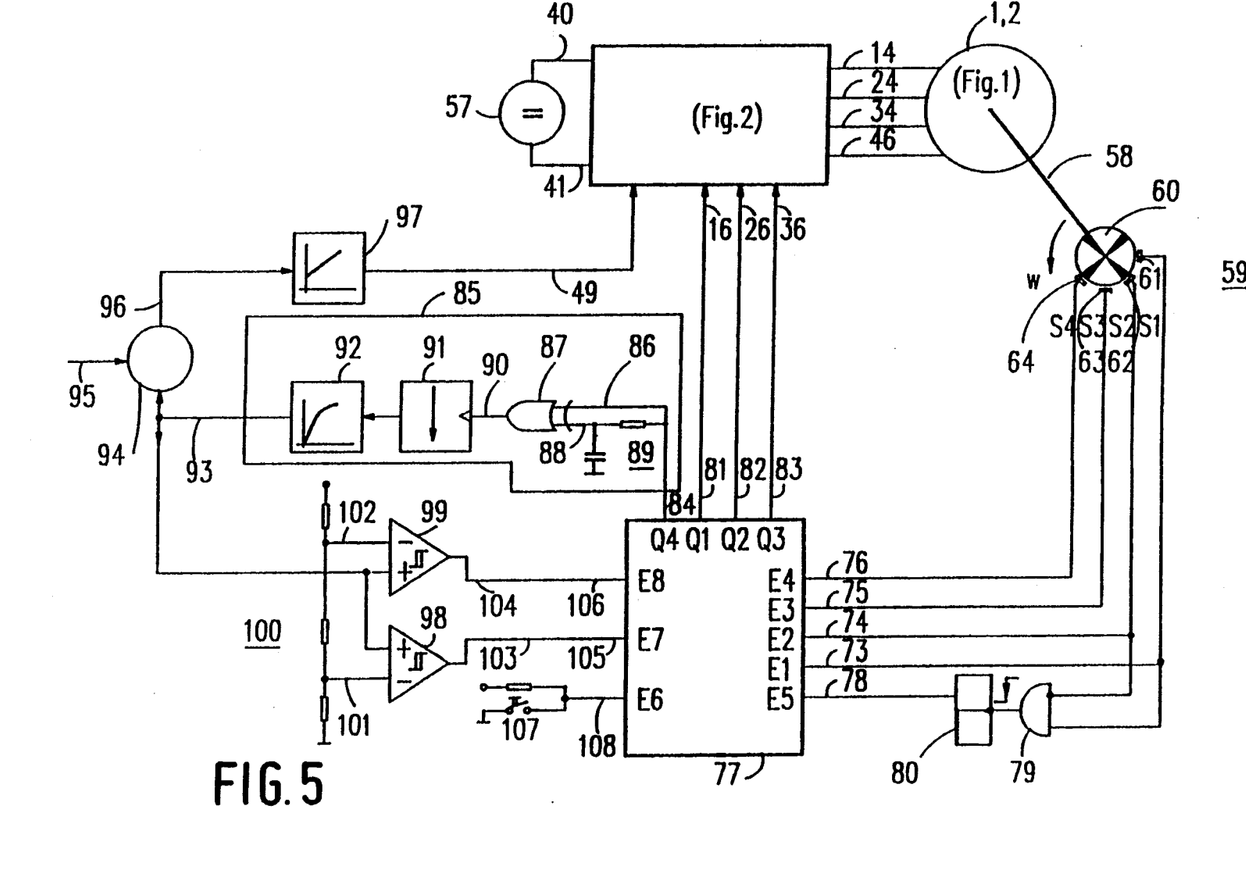
FIG. 5 is a block diagram of a reluctance motor including the circuit arrangement of FIG. 1.

FIG. 5 shows a block diagram of an exemplary embodiment of a circuit arrangement with which the reluctance motor shown in FIG. 1 can be operated in the above-described manner according to the invention. The motor comprising stator 1, rotor 2 and windings 10, 20 and 30 as well as the static frequency changer as shown in FIG. 2 are shown in the top section of FIG. 5; the terminals of the circuit shown in FIG. 2 of the dc voltage source 57 as well as the further terminals and junctions are labelled with the same reference characters previously described.

Figure 6:
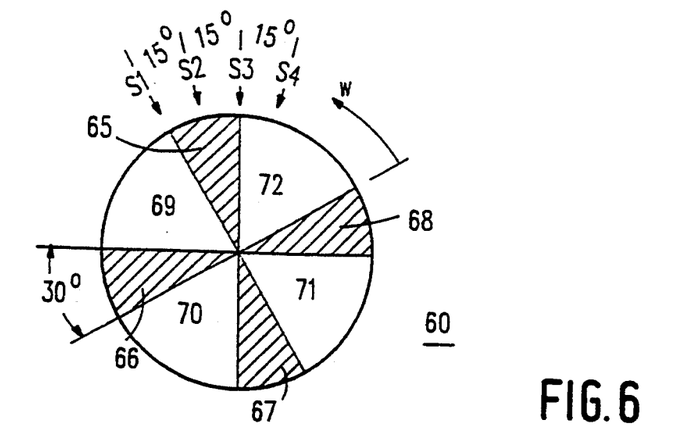
FIG. 6 diagrammatically illustrates a position signal generator of FIG. 5.

In the exemplary embodiment as shown in FIG. 5 the rotor 2 of the reluctance motor is coupled by means of a mechanical connection represented as a shaft 58 to a position signal generator 59 for generating a position signal representing the position of the rotor 2 along the motion coordinate W. Position signal generator 59 has a motion coordinate generator element 60 which rotates in tandem with the rotor 2. As shown in FIG. 6, the motion coordinate generator element 60 corresponds to the second cyclic arrangement in which the rotor 2 of the reluctance motor is subdivided, segmented. Four sensing elements are arranged around the motion coordinate generator element 60, which corresponds to the second cyclic arrangement, that is, corresponds to the number of segments of the rotor 2 and associated segmentation of the motion coordinate generator element 60. In the present example the number of sensing elements 61 to 64 corresponds to the number of rotor poles 3 of rotor 2. The sensing elements 61 to 64 are interspaced along the motion coordinate W of the rotor 2 with a distance that forms the least common multiple of the first cyclic arrangement (of the stator 1) and of the second cyclic arrangement (of the rotor 2) of a full cycle of the stator arrangement. In the present example in which a full cycle of the stator arrangement includes a 360° range of the motion coordinate W, a unit of length along the motion coordinate W is equal to 15°. This unit of length is based on the first cyclic arrangement of the stator 1 (i.e. the six stator poles) and the second cyclic arrangement of the rotor 2 (i.e. the four rotor poles). The above unit of length of 15° along the motion coordinate W corresponds to one twenty-fourth part of the overall circumference (i.e. full 360° cycle) of the stator 1.

The motion coordinate generator element 60, as shown in FIG. 6, is divided into first line sections 65, 66, 67 and 68 of 30° each (i.e. two 15° units of length) and into second line sections 69, 70, 71 and 72 of 60° (i.e. four 15° units of length. The sensing elements 61–64 produce a first value when sensing a first line section 65, 66, 67, or 68 of two units of length (in the present example 30°)—and a second value when sensing second line section 69, 70, 71 or 72 of four units of length (in the present example 60°). The sensing elements 61 to 64 produce signals S1 to S4 respectively. The position of the sensing elements 61 to 64 relative to the motion coordinate generator element 60 are identified in FIG. 6 by arrows denoting the signals S1 to S4. The diagrammatical representation of the first sections 65 to 68 differing from the second sections 69 to 72 denotes the different configuration of these sections in the motion coordinate generator element 60. A first and a contiguous second section, for example, 65 and 69, form a segment of the motion coordinate generator element 60. Each of the segments preferably has an optical and/or electrical and/or magnetic property extending across the entire segment. The sensing elements 61 to 64 are designed to sense the optical and/or electrical and/or magnetic properties.

The signals S1 to S4 supplied by the sensor elements 61 to 64, each of which can assume first and second values, collectively form the position signal. This position signal is applied to the inputs 73, 74, 75 and 76 of a controller 77 where the signals S1 to S4 are referenced the input signals E1 to E4. A further input signal E5 of the controller 77, receiving an input 78, is connected to the output of a flip-flop stage 80 Signal S1 and the inverted form of the signal S2 are supplied to an AND gate 79 and outputted to flip-flop stage 80 resulting in the subsequent doubling of the period. Stage 80 is switched for each descending edge of the signal produced by the AND gate 79.

The controller 77 preferably comprises a memory means, more specifically, a programmable random access memory (PROM-APROM or the like). Switching information signals are stored in controller 77 for each value position signal and of the input signal at the input 78, i.e. for each combination of signal values for signals E1 to E5. A plurality of signals Q1, Q2 and Q3 are produced at outputs 81, 82 and 83 respectively, of the controller 77 and applied to a plurality of selector points 16, 26 and 36 of the circuit arrangement shown in FIG. 2.

The controller 77 also includes an output 84 at which an output signal Q4 is produced. The value of output signal Q4 is changed from a first to a second signal value or vice versa each time the rotor 2 is moved along the motion coordinate W by a unit of length. Output signal Q4, which forms a square-wave signal is processed by a signal forming stage 85 forming an analog speed signal. For this purpose, the signal Q4 is applied to a first input 86 of exclusive-OR gate 87 directly and to a second input 88 of the gate 87 through an RC low-pass filter 89. At the output 90 of the exclusive-OR gate 87 a pulse train is thus developed having the length of half a period of the signal Q4. The pulse train activates with the descending edges of its pulses a monostable trigger element 91. The signal produced by the monostable trigger element 91 includes pulses of a constant duration and has a duty cycle which depends on the speed of the rotor 2. The dc voltage portion of the analog system is extracted from the output of monostable trigger element 91 filter 92 and it is made available at an output of the signal forming stage 85.

The actual speed signal of output 93 is supplied to a subtractor stage 94 and subtracted from a nominal speed value supplied through a nominal value input 95. From output 96 of the subtractor stage 94 the difference between the nominal speed and the actual speed signal is supplied to the nominal current terminal 49 as a nominal current value via a PI-controller 97, thereby closing the loop for controlling the speed.

The speed signal from output 93 is furthermore applied to two threshold switches 98 and 99—preferably comparators or Schmitt trigger circuits—which are also supplied with reference voltages by a reference voltage divider 100 from a pair of taps 101, 102 to form switching thresholds. Accordingly, the first threshold switch 98 produces a first speed signal E7 through its output 103 at speeds exceeding a first switching threshold, which is applied to an input 105 of the controller 77. The second threshold switch 99 produces a second speed signal E8 at an output 104 when the speed signal of the output 93 of the signal forming stage 85 exceeds a second switching threshold which is higher than the first switching threshold. The second speed signal E8 is applied to input 106 of the controller 77.

A change-over switch 107 furthermore produces a direction signal E6 and supplies this signal to an associated input 108 of the controller 77.

Controller 77 is informed of specific excessive values of the speed of the rotor 2 based on signals E7 and E8. In response to signals E7, E8, controller 77 can initiate different measures for influencing the current supply to the windings 10, 20, 30 for various speed ranges. For this purpose, more or fewer threshold switches may be provided depending on the operation desired. In the example shown, preferably the signal E7 may effect e.g. a specific 15° shift between the position of the rotor 2 and the initial and final positions of the current pulses I1, I2, I3. As a result of signal ES, i.e. when the higher second switching threshold is exceeded, the current pulses can be faded out and, simultaneously, the above-described extension and shift of the current pulses, along the motion coordinate W for speeds (high numbers of rotations) be effected. The switching information Q1 to Q4 for the different combinations of input signals E1 to E8 required for this purpose are stored in the memory means in the controller 77.

Figure 7:
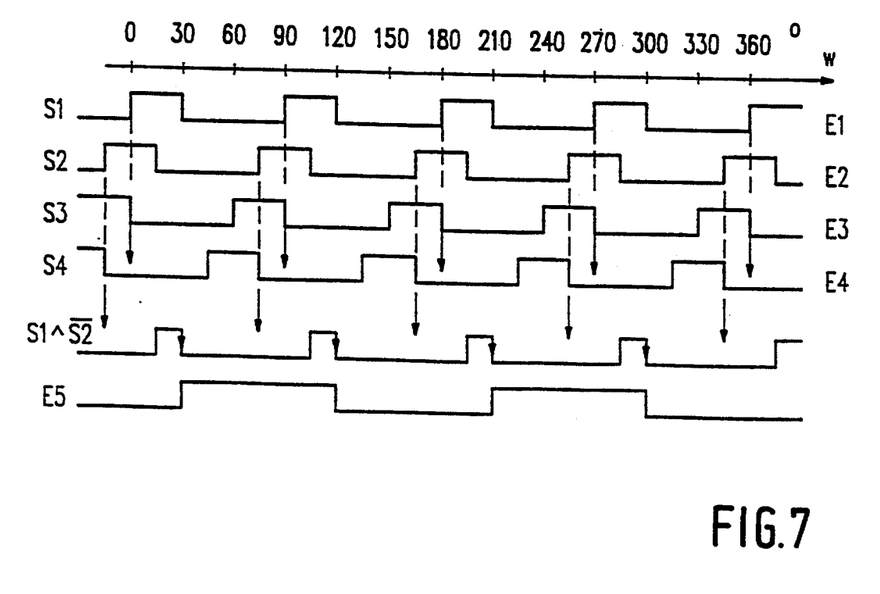
FIG. 7 shows the signal variations for the position signal of FIG. 5.

FIG. 7 depicts the signals S1 to S4 forming the position signal of the sensor elements based on the circuit arrangement of FIG. 5. Signals S1 to S4 correspond to the input signals E1 to E4 of the controller 77, respectively, along the motion coordinate W for a full cycle of the rotor 2, i.e. a complete 360° cycle along the motion coordinate W. FIG. 7 also includes the output signal of the AND gate 79 and the input signal E5. The positions marked by arrows along the motion coordinate W identify the leading edges of signals S1 and S2 which coincide with the trailing edges of signals S3 and S4. As a result of manufacturing tolerances, however, different combinations of the signals S1 to S4 and E1 to E4 may occur at these positions. These combinations identify transient conditions which are reflected by the combination of signal values Q1 to Q4. Typical manufacturing tolerances associated with the position signal generator 59 therefore will not adversely affect operation. Table 1, appended hereto, represents an example of various signals discussed heretofore reflecting various transient and operational conditions. Signals S1–S4 of sensor elements 61–64 reflect all possible values of the position signal. Blocks A and B in the Table describe the position signals when input signal E5 has a value of 0 and 1, respectively (i.e. for first and second signal values). Blocks C and D list possible values of the position signal as represented by signals S1–S4 and the input signal E5 for transient conditions with appropriate tolerances.

The columns to the right of the column for the signal E5 show three operating conditions referenced OC1, OC2 and OC3 which may be determined in the controller 77, for example, by the signals E6 to E8. Table 1 also includes, for each of the three operating conditions OC1, OC2 and OC3, the switching information signals Q1 to Q4. The last column of the Table 1 lists the values of the output signal Q4 which is independent of the position signal and input signal E5.

The first operating condition referenced OC1 corresponds to the movement of the rotor 2 in a first direction at low speeds as shown in FIG. 3. When signals Q1 to Q3 assume a high logic level of 1, a current pulse flows through the associated winding 10, 20, 30, respectively. When signals Q1–Q3 assume a low logic level of 0, no current pulse is applied to the associated winding 10, 20, 30 respectively.

The second operating condition OC2 corresponds to slow movement of the rotor 2 in a direction opposite to its direction in first operating condition OC1. The third operating condition OC3 corresponds to fast movement of the rotor 2 in the same direction as in the first operating condition. Current variations for the third operating condition OC3 are shown in FIG. 4.

In the exemplary embodiment of the invention represented in FIG. 5 and explained with reference to Table 1, rotor speed is controlled by amplitude control of the current pulses I1 to I3 through the two coupled control loops of FIG. 5. In the outside control loop, the nominal current value is determined by the PI-controller 97 and, at the nominal current terminal 49, made available to the inside control loop represented in FIG. 2 as current regulator 51. The current regulator 51, which regulates the current controlling transistor 43 and therefore serves as a duty cycle controller, results in the sawtooth current behaviour of the current pulses I1 to I3 shown in FIGS. 3 and 4.

The afore-described arrangement may also be used, for example, for linear motors, in addition to rotary motors. With a linear motor the rotational symmetrical arrangements of rotor and stator shown in FIG. 1 are replaced by linear arrangements A complete cycle for the linear motor can correspond to rotation of rotor 2 over less than 360°. A number of linear cycles may be required with the linear motor to complete the equivalent of a 360° rotation of rotor 2. The motion coordinate W for a linear motor is determined in the cartesian coordinate system.

The circuit arrangement shown in FIG. 5 forms, in essence, an analog control circuit; the function of the controller, the signal forming stage for the speed signal and the threshold switches, however, can also be combined into one digital control circuit.

It will thus be seen that the objects set forth above, and thus made apparent from the preceding description, are efficiently obtained and, since certain changes may be made in the above construction without departing from the spirit and scope of the invention, it is intended that all matter contained in the above description or shown in the accompanying drawings shall be interpreted as illustrative and not in a limiting sense. It is also to be understood that the following claims are intended to cover all the generic and specific features of the invention, which, as a matter of language, might be said to fall therebetween.

TABLE I

| Position signal | | | | | OC1. | | | OC2. | | | OC3. | | | |
|---|---|---|---|---|---|---|---|---|---|---|---|---|---|---|
| S1 | S2 | S3 | S4 | E5 | Q1 | Q2 | Q3 | Q1 | Q2 | Q3 | Q1 | Q2 | Q3 | Q4 |
| A | | | | | | | | | | | | | | |
| 1 | 1 | 0 | 0 | 0 | 1 | 0 | 0 | 0 | 1 | 0 | 1 | 0 | 0 | 1 |
| 1 | 0 | 0 | 0 | 0 | 1 | 0 | 0 | 0 | 0 | 1 | 1 | 0 | 0 | 0 |
| 0 | 0 | 0 | 0 | 0 | 0 | 1 | 0 | 0 | 0 | 1 | 0 | 1 | 0 | 1 |
| 0 | 0 | 0 | 1 | 0 | 0 | 1 | 0 | 1 | 0 | 0 | 0 | 1 | 0 | 0 |
| 0 | 0 | 1 | 1 | 0 | 0 | 0 | 1 | 1 | 0 | 0 | 0 | 0 | 0 | 1 |
| 0 | 1 | 1 | 0 | 0 | 0 | 0 | 1 | 0 | 1 | 0 | 1 | 0 | 0 | 0 |
| B | | | | | | | | | | | | | | |
| 1 | 1 | 0 | 0 | 1 | 1 | 0 | 0 | 0 | 1 | 0 | 0 | 0 | 0 | 1 |
| 1 | 0 | 0 | 0 | 1 | 1 | 0 | 0 | 0 | 0 | 1 | 0 | 1 | 0 | 0 |
| 0 | 0 | 0 | 0 | 1 | 0 | 1 | 0 | 0 | 0 | 1 | 0 | 0 | 0 | 1 |
| 0 | 0 | 0 | 1 | 1 | 0 | 1 | 0 | 1 | 0 | 0 | 0 | 0 | 1 | 0 |
| 0 | 0 | 1 | 1 | 1 | 0 | 0 | 1 | 1 | 0 | 0 | 0 | 0 | 1 | 1 |
| 0 | 1 | 1 | 0 | 1 | 0 | 0 | 1 | 0 | 1 | 0 | 0 | 0 | 1 | 0 |
| C | | | | | | | | | | | | | | |
| 0 | 1 | 0 | 0 | 0 | 0 | 0 | 1 | 0 | 1 | 0 | 1 | 0 | 0 | 0 |
| 0 | 0 | 1 | 0 | 0 | 0 | 0 | 1 | 1 | 0 | 0 | 0 | 0 | 0 | 1 |
| 1 | 1 | 1 | 0 | 0 | 1 | 0 | 0 | 0 | 1 | 0 | 1 | 0 | 0 | 1 |
| 0 | 1 | 1 | 1 | 0 | 0 | 0 | 1 | 0 | 1 | 0 | 1 | 0 | 0 | 0 |
| D | | | | | | | | | | | | | | |
| 0 | 1 | 0 | 0 | 1 | 0 | 0 | 1 | 0 | 1 | 0 | 0 | 0 | 1 | 0 |
| 0 | 0 | 1 | 0 | 1 | 0 | 0 | 1 | 1 | 0 | 0 | 0 | 0 | 1 | 1 |
| 1 | 1 | 1 | 0 | 1 | 1 | 0 | 0 | 0 | 1 | 0 | 0 | 0 | 0 | 1 |
| 0 | 1 | 1 | 1 | 1 | 0 | 0 | 1 | 0 | 1 | 0 | 0 | 0 | 1 | 0 |

We claim:

1. A circuit arrangement for commutating a reluctance motor having a stator and a rotor, the rotor traveling along a motion coordinate path relative to the stator, comprising:
a plurality of stator windings; and
current generating means for producing a first cyclic sequence of current pulses resulting in the rotor traveling a predetermined distance along the motion coordinate path and for producing a second cyclic sequence of current pulses resulting in the rotor traveling at least approximately twice the predetermined distance along the motion coordinate path, said stator windings being supplied with said second cyclic sequence of current pulses when rotor speed exceeds a predetermined level;
wherein said second cyclic sequence of current pulses is formed by omitting predetermined current pulses from said first cyclic sequence.

2. The circuit arrangement of claim 1, wherein said first cyclic sequence includes the repetitive pattern of a first train of current pulses followed by a second train of current pulses followed by a third train of current pulses, said second cyclic sequence including the repetitive pattern of the first train of current pulses followed by the third train of current pulses followed by the second train of current pulses and wherein each train of current pulses is of predetermined length and phase relative to the motion coordinate path.

3. The circuit arrangement of claim 1, wherein each train of current pulses within the first cyclic sequence is of shorter duration than each train of current pulses within the second cyclic sequence.

4. The circuit arrangement of claim 2, wherein relative to the motion coordinate each train of current pulses within the second cyclic sequence ends at substantially the same position as a train of current pulses within the first cyclic sequence.

5. The circuit arrangement of claim 1, wherein the current generating means includes an asymmetrical H circuit associated with each stator winding having a first longitudinal branch common to all H circuits and a second longitudinal branch, said first longitudinal branch and each second longitudinal branch including switching means serially connected to rectifier means.

6. The circuit arrangement of claim 5 in combination with a DC voltage source has a positive terminal and a negative terminal, wherein the rectifier means of each second longitudinal branch having a cathode connected to the positive terminal of the DC voltage source.

7. The circuit arrangement of claim 6, wherein the switching means of the first longitudinal branch and the rectifier means of each second longitudinal branch are connected to the same terminal of the DC voltage source and wherein each asymmetrical H circuit also includes a transverse branch which includes the associated stator winding, each longitudinal branch having a junction joining together the switching means and rectifier means of that branch and one end of the associated transverse branch.

8. The circuit arrangement of claim 7, further including measuring means connected between one of the terminals of the DC voltage source and each of the second longitudinal branches.

9. The circuit arrangement of claim 1, further including signal generating means for generating a position signal representing the position of the rotor along the motion coordinate path.

10. The circuit arrangement of claim 9, further including processing means responsive to the position signal for producing a speed signal representing rotor speed.

11. The circuit arrangement of claim 10, wherein the rotor includes a plurality of poles and wherein said signal generating means includes a motion coordinate generating means connected to the motor and divided into a plurality of first segments and a plurality of second segments based on at least the plurality of rotor poles, said first segments and second segments forming an alternating contiguous pattern on said motion coordinate generating means.

12. The circuit arrangement of claim 11, wherein said signal generating means further include a plurality of sensing elements corresponding in number to the number of rotor poles and positioned about the motion coordinate generating means with adjacent sensing elements separated from each other by a fixed distance.

13. The circuit arrangement of claim 12, wherein said sensing means are operable for producing a first signal when sensing each first segment for a period of time corresponding to about twice the fixed distance along the motion coordinate path and for producing a second signal when sensing the second segment for a period of time corresponding to about four times the fixed distance along the motion coordinate path.

14. The circuit arrangement of claim 13, wherein each of the first segments is characterized by at least one of a first optical property, a first electrical property and a first magnetic property; said second segment being characterized by at least one of a second optical property, second electrical property and second magnetic property; each of said sensing means being operable for sensing the at least one property characterized by each of the first segments and the second segments.

15. The circuit arrangement of claim 10, wherein said processing means includes control means responsive to the position signal and a feedback signal representing the speed signal for producing control signals, said current generating means being responsive to said control signals for producing said first cyclic sequence of current pulses and said second cyclic sequence of current pulses.

16. The circuit arrangement of claim 15, wherein the switching states of each switching means of each second longitudinal branch is based on the control signals; the switching states of the switching means of each second longitudinal branch thereby reflecting the values of the position signal and speed signal.

* * * * *